Patented Oct. 30, 1945

2,387,824

UNITED STATES PATENT OFFICE 2,387,824

AMINO ACID SEPARATION

Richard J. Block, Scarsdale, N. Y., assignor to C. M. Armstrong, Inc., a corporation of New York No Drawing. Application April 3, 1943, Serial No. 481,787

7 Claims. (Cl. 260—529)

This invention relates to the separation of amino acids and particularly to the method of separating from each other in aqueous solution the essential amino acids which contain a plurality of nitrogen atoms.

The essential amino acids containing a plurality of nitrogen atoms to the molecule are arginine, lysine and histidine. These amino acids are herein sometimes referred to as "polyamino acids" even though only one of the nitrogen atoms of histidine occurs in an amino group.

This application is a continuation in part of my copending application for U. S. Patent Ser. No. 466,217, filed November 19, 1942, for "Separation of amino acids."

In this earlier application there was stated some of the reasons why it is important to make a separation of the amino acids from each other and there was given a convenient method for separating the monoamino acids from the polyamino acids.

I have now discovered means of effecting a separation within the polyamino class of essential amino acids, giving a convenient method of concentration and separation to a large extent of arginine, lysine, and histidine from each other.

Briefly stated, the present invention comprises the herein described method for effecting such separation of these three essential amino acids from each other by first contacting an acidic solution of the amino acids with a cation exchanger, so as to absorb the amino acids on the exchanger, separating the remaining solution from the exchanger and sorbed amino acids thereon, and then contacting the exchanger and the sorbed acids with an aqueous solution of a desorbing acid at a pH of about 0.3 to 1 and preferably at about 0.6 to 1. The contact with the desorbing acid is suitably made in an elutriating tower or column. The elutriated material contains a higher proportion of lysine to histidine or arginine than did the original amino acid solution used.

In a preferred embodiment, the invention comprises subjecting the elutriated material to the same series of steps again, including contact of the exchanger with an acid solution of the amino acids present in the elutriate, separation of remaining solution, as by drainage and washing, and then contact with the desorbing acid of a pH of the range stated, so as to increase further the concentration of lysine with respect to the other two amino acids.

In one embodiment, the invention comprises also the treatment of the exchanger and sorbed amino acids, before contact with the desorbing acid, with dilute aqueous ammonium hydroxide, the ammonia serving to desorb the histidine so that it is separated almost quantitatively by draining and washing from the other two essential acids, these other amino acids being recovered by first removing the ammonia with dilute acid, and then liberating the arginine and lysine with the desorbing acid of pH about 0.3 to 1, all as described in more detail elsewhere herein.

As the amino acid composition serving as the raw material for the separation, there may be used a solution of amino acids made as described in my said copending application. Thus there may be used a solution of the hydrochloric acid salts of the amino acids made by the acid hydrolysis of proteins. Also, the monoamino acids may be separated by the use of the cation exchanger from the polyamino acids, as described in my said copending application, and the column washed with water until the effluent is substantially neutral, so that there is left on the exchanger a sorbed material consisting largely of the polyamino acids arginine, lysine, and histidine. This sorbed material may serve as the raw material and be treated with the desorbing acid and subjected to subsequent steps described later.

The cation exchanger used may be any one of the class represented by those described in the copending application. The exchanger as contacted with the solution of the amino acids to be separated must be adjusted to the hydrogen cycle, that is, in the condition in which it absorbs cation material in an acidic solution. Thus there may be used to advantage such resin exchanger as the phenolic formaldehyde sulfonic acid resins known by the trade names Amberlite IR-1 and IR-100, tannic acid and formaldehyde resins, and sulfonated coal, all being adjusted initially to the acid cycle by treatment with strong acid such as 10% or so of hydrochloric acid and then washing with water to remove most of the excess of strong acid.

The exchanger is ordinarily used in solid granulated form and before use is filled into a container of which a tower is a particularly suitable form, say, one that is about 1 to 5 feet long for laboratory use and 5 to 30 feet or so for large scale plant operation.

A solution of arginine, lysine and histidine may be used as the raw composition for separation. The solution is contacted with the exchanger, as by being flowed downwardly over the exchanger and then out of the container. The solution used is an aqueous solution of the salts of the amino acids with hydrochloric, sulfuric, hydrobromic, nitric or like acid.

The exchanger is used in excess of the amount required to absorb the amino acids and under conditions recited in the said copending application. The exchanger serves to absorb the amino acids from the solution and fix them on or in the granules of the exchanger.

The remaining liquor is separated from the exchanger insofar as convenient, as by draining of the column. Then there is added a desorbing acid, say a dilute aqueous solution of a mineral acid that is just low enough in pH to cause desorption of the amino acids from the exchanger. Thus there may be used to advantage a dilute aqueous mineral acid of pH 0.3 to 1, a pH of 0.6 to 1 being especially desirable. When the pH is substantially higher than 1, the acid does not cause proper desorption of the lysine. When much stronger than pH 0.3, the desorbing acid removes all three polyamino acids, practically quantitatively.

As the desorbing or liberating acid, I have used to advantage an aqueous solution of sulfuric acid of acid concentration about 1.5 to 2.5% by weight. There may be used, however, an aqueous solution of hydrochloric, hydrobromic, nitric or like acid of about the same pH as the sulfuric acid as originally charged to the exchanger and sorbed material.

The desorbing acid effects an elutriation of the polyamino acids from the exchanger by distribution of the amino acid between the desorbing acid and the exchanger, the elutriation being more effective for histidine than for arginine. Thus I have found it possible to obtain by elutriation in this manner practically 100% of the lysine originally charged as compared to an average of about 70% for the histidine and 55% for the arginine.

Elutriated solutions thus obtained contain, therefore, a higher proportion of lysine to the other polyamino acids and a higher proportion of histidine to arginine than was present in the amino acid solution originally contacted with the exchanger.

The elutriate so obtained may be recontacted with fresh exchanger of the kind described, so as to give a final elutriate that is still richer in lysine and also richer in histidine as compared to arginine than was the first elutriate.

The separation is improved and made more convenient when the method is somewhat modified by an initial treatment of the sorbed material with ammonia.

In this modification the histidine is first released from the absorption on the exchanger by treating the exchanger including the sorbed essential polyamino acids with a dilute aqueous solution of ammonium hydroxide in excess of the amount equivalent as an alkali to histidine. In this manner the histidine is liberated by the ammonia and is recoverable from the elutriate.

The arginine and lysine remain behind in the column.

The arginine and lysine are then separated by elutriation with 1.5% to 2.5% sulfuric acid or the like, elutriation giving an increase in the proportion of the lysine in the elutriate as compared to arginine over the proportion in the original amino acid solution contacted with the exchanger.

When arginine and lysine are the only essential amino acids to be separated from each other, then the absorption on the cation exchanger in the presence of an acid is effected by contact as described above, and the lysine is liberated or desorbed by means of the dilute sulfuric acid of concentration 1.5 to 2.5% or other dilute aqueous mineral acid of pH about 0.3 to 1 and preferably 0.6 to 1.

It should be noted that lysine, which of the several amino acids is most readily desorbed by acid treatment, comes between histidine and arginine in strength as a base.

On a large scale these separations are ordinarily effected in towers and the percolating with the desorbing acid is discontinued when the pH and volumes through are such as to show on the basis of tests of previous runs or test with phosphotungstic acid show that the elutriate is falling rapidly in concentration of amino acids. Ordinarily there is used about 5 to 15 and preferably about 7 to 12 volumes of the desorbing acid for one volume of exchanger used.

Solutions of the polyamino acids so concentrated may then be further purified and the amino acids separated by known technique for effecting the final concentration or purification.

Temperatures of contact of the amino acid solutions with the exchanger and of draining, washing, and desorption by means of dilute aqueous acid are ordinarily about room temperatures. Other temperatures so far have not been found to offer large advantages over the more convenient room temperatures.

Concentrations of the amino acid solutions initially subjected to contact with the exchanger and other conditions of initial contact with the exchanger may be as described in my said copending application. Suitable concentrations are within the range of about 1 to 10 milligrams of amino nitrogen (calculated as nitrogen) for 1 cc. of the solution, although concentrations outside this range may be used.

The invention will be further illustrated by detailed description in connection with the following specific examples of the practice of the invention, the first example relating to the use of no ammonia and the third describing the use of ammonia to separate histidine as a preliminary step in the separation of the essential polyamino acids from each other.

*Example I*

A protein hydrolysate made by acid hydrolysis of protein is formed into a solution that may or may not include an excess of hydrochloric acid or the like. The solution is percolated through a base retaining cation exchanger such as Amberlite IR-1, in a tower, and the effluent collected as it issues from the bottom of the tower. The material remaining in the tower is then contacted with a large volume of water or a dilute mineral acid to liberate from the exchanger most of the monoamino acids and leave on the exchanger in the tower most of the polyamino acids. The processing as to details not given herein is effected as described in the said copending application. The product in the tower is washed with cation free water until the washings are practically free from acid.

There is thus obtained in the tower the product of absorption of polyamino acids on the cation exchange resin with minor proportions of some of the monoamino acids. This product is contacted with about 10 times its overall volume containing about 1.5 to 2.5% by weight of sulfuric acid in 100 parts of sulfuric acid and water. Preferably the sulfuric acid is allowed to percolate through the tower.

The effluent so obtained contains about 98 to 100% of the total lysine originally used, about 75% of the histidine, but only about 50% of the arginine.

The effluent is then contacted with additional fresh exchanger in about the proportion described and the sorbed material subjected to the subsequent steps in the cycle of treatment, this resulting in a further increase in the elutriate of the proportion of the lysine to the other two amino acids and in the proportion of histidine to arginine.

Portions of the latter two amino acids remaining in the tower are then removed by washing the exchanger therein with about 5% sulfuric acid, 7% hydrochloric acid or other solution of strong mineral acid, such as hydrobromic acid. More concentrated solutions of the acids may be used, but they should be of such concentration as to give a pH below 0.3 and suitably below 0.1.

In the elutriates so obtained further separations of the lysine from the other amino acids, which are present in relatively small amount, and of lysine from histidine are effected in conventional manner.

Example II

The procedure of Example I is followed except that there is no substantial percentage of histidine present in the original amino acid solution. By the use of such solution, a better separation of lysine from other polyamine acids is obtained.

Obviously, the final step of separating histidine from lysine is omitted in this example.

Example III

The procedure of Example I and of the said copending application is followed up to the point in which there is produced in a tower the washed product of sorption of arginine, lysine and histidine upon the cation exchanger with a minimum proportion only of monoamino acids present.

This sorption product is then treated with an excess of a dilute aqueous solution of ammonium hydroxide containing about 1 to 10% of ammonia calculated as NH₃ on the total weight of water and ammonia. Suitably the ammonia solution is allowed to percolate through a column of the exchanger and polyamino acids sorbed thereon. During this contact, the ammonium group replaces histidine.

The histidine so freed is then collected with the effluent from the ammonium hydroxide treatment.

The material in the column is then percolated with about 1% hydrochloric acid or other mineral acid in amount at least slightly in excess of the proportion of ammonium hydroxide left in the column, this treatment serving to remove the ammonia.

There remains, as sorbed materials, arginine and lysine, the separation of which from each other is effected as described in Example I, the absence of histidine facilitating the separation.

In place of the ammonia for liberating the histidine, there may be used some other weak base, as for example, methyl amine, or an equimolecular mixture of sodium tri- and sodium diphosphates.

It will be understood also that it is intended to cover all changes and modifications of the example of the invention herein chosen for the purpose of illustration which do not constitute departures from the spirit and scope of the invention.

What I claim is:

1. In effecting the separation of amino acids containing a plurality of nitrogen atoms in a mixture of such acids, the method which comprises forming an aqueous solution including salts of arginine and lysine with an acid, contacting the solution with a solid cation exchanger adjusted to the acid cycle, draining remaining solution from the exchanger, washing the exchanger and absorbed material with water, then elutriating the washed product with an aqueous solution of a desorbing acid at a pH of about 0.3 to 1, and separating the resulting elutriate from the exchanger, the proportion of lysine to arginine being substantially higher in the elutriate than in the original solution of the amino acids used.

2. The method described in claim 1, including replacing the said solution used originally by the elutriate from a previous separation, so as to cause recycling of the elutriate, the proportion of lysine to arginine being further increased.

3. The method described in claim 1, the pH of the aqueous solution of the desorbing acid being approximately 0.6 to 1 as contacted with the exchanger and absorbed material.

4. The method described in claim 1, the desorbing acid in the said aqueous solution being sulfuric acid of concentration about 1.5% to 2.5%.

5. In separating polybasic amino acids from each other, the method which comprises forming an aqueous solution including salts of an acid with lysine, histidine, and arginine, contacting the solution with a solid cation exchanger serving to absorb lysine, histidine, and arginine from the solution, draining remaining solution from the exchanger, washing the solid product with water, and then elutriating the washed product with dilute mineral acid at a pH of about 0.3 to 1, so as to desorb the amino acids from the exchanger, the proportion of lysine to histidine and of histidine to arginine being higher in the resulting elutriate than in the ordinarily used acid solution.

6. In separating polybasic amino acids from each other, the method which comprises forming an aqueous solution including salts of an acid with lysine, histidine and arginine, contacting the solution with a cation exchanger serving to absorb lysine, histidine and arginine from the solution, draining remaining solution from the exchanger, then contacting the exchanger and absorbed material with an aqueous solution of ammonium hydroxide in amount in moderate excess of the proportion equivalent as an alkali to the histidine present, the ammonium hydroxide solution serving to desorb the histidine from the exchanger without liberating corresponding proportions of lysine and arginine present, and then separating the resulting solution of histidine from the exchanger.

7. In separating polybasic amino acids from each other, the method which comprises forming an aqueous solution including salts of an acid with lysine, histidine, and arginine, contacting the solution with a cation exchanger serving to absorb lysine, histidine and arginine from the solution, draining remaining solution from the exchanger, then contacting the exchanger and absorbed material with an aqueous solution of a weak base in amount in excess of the proportion equivalent as an alkali to the histidine present, the weak base solution serving to desorb the histidine from the exchanger, then separating the resulting solution of histidine from the exchanger, and then elutriating the exchanger and sorbed lysine and arginine with an aqueous solution of an acid at a pH of about 0.3 to 1, and separating the elutriate from the exchanger, the proportion of lysine to arginine being substantially higher in the elutriate than in the solution of the amino acids originally used.

RICHARD J. BLOCK.